United States Patent
Cabral et al.

(10) Patent No.: US 8,749,662 B2
(45) Date of Patent: Jun. 10, 2014

(54) SYSTEM AND METHOD FOR LENS SHADING IMAGE CORRECTION

(75) Inventors: Brian Cabral, San Jose, CA (US); Hu He, Santa Clara, CA (US); Elena Ing, Santa Clara, CA (US); Sohei Takemoto, Fremont, CA (US)

(73) Assignee: Nvidia Corporation, Santa Clara, CA (US)

( * ) Notice: Subject to any disclaimer, the term of this patent is extended or adjusted under 35 U.S.C. 154(b) by 194 days.

(21) Appl. No.: 12/752,878

(22) Filed: Apr. 1, 2010

(65) Prior Publication Data
US 2010/0265358 A1 Oct. 21, 2010

Related U.S. Application Data

(60) Provisional application No. 61/170,014, filed on Apr. 16, 2009.

(51) Int. Cl.
H04N 9/68 (2006.01)

(52) U.S. Cl.
USPC ...................................... 348/224.1

(58) Field of Classification Search
USPC .............. 348/223.1, 251; 345/423; 382/274
See application file for complete search history.

(56) References Cited

U.S. PATENT DOCUMENTS

| | | |
|---|---|---|
| 3,904,818 A | 9/1975 | Kovac |
| 4,253,120 A | 2/1981 | Levine |
| 4,646,251 A | 2/1987 | Hayes et al. |
| 4,685,071 A | 8/1987 | Lee |
| 4,739,495 A | 4/1988 | Levine |
| 4,771,470 A | 9/1988 | Geiser et al. |
| 4,920,428 A | 4/1990 | Lin et al. |
| 4,987,496 A | 1/1991 | Greivenkamp, Jr. |
| 5,175,430 A | 12/1992 | Enke et al. |
| 5,261,029 A | 11/1993 | Abi-Ezzi et al. |
| 5,305,994 A | 4/1994 | Matsui et al. |
| 5,387,983 A | 2/1995 | Sugiura et al. |
| 5,475,430 A | 12/1995 | Hamada et al. |
| 5,513,016 A | 4/1996 | Inoue |
| 5,608,824 A | 3/1997 | Shimizu et al. |

(Continued)

FOREIGN PATENT DOCUMENTS

| | | |
|---|---|---|
| CN | 1275870 | 12/2000 |
| EP | 0392565 | 10/1990 |

(Continued)

OTHER PUBLICATIONS

Goshtasby, Ardeshir; "Correction of Image Deformation From Lens Distortion Using Bezier Patches"; 1989; Computer Vision, Graphics, and Image Processing, vol. 47; pp. 358-394.*

(Continued)

Primary Examiner — Gary C Vieaux

(57) ABSTRACT

A system and method for correcting image data. Embodiments of the present invention provide calibration and image correction to overcome various lens effects including lens shading and lens imperfections. In one embodiment, the correction of image data is performed via utilization of a spline surface (e.g., Bezier surface). The use of spline surfaces facilitates efficient hardware implementation. The image correction may be performed on a per channel and illumination type basis. In another embodiment, the present invention provides a method for determine a spline surface to be used for calibrating an image signal processor to be used in correcting image data.

20 Claims, 7 Drawing Sheets

(56) References Cited

U.S. PATENT DOCUMENTS

| | | |
|---|---|---|
| 5,652,621 A | 7/1997 | Adams, Jr. et al. |
| 5,793,433 A | 8/1998 | Kim et al. |
| 5,878,174 A | 3/1999 | Stewart et al. |
| 5,903,273 A | 5/1999 | Mochizuki et al. |
| 5,905,530 A | 5/1999 | Yokota et al. |
| 5,995,109 A | 11/1999 | Goel et al. |
| 6,016,474 A | 1/2000 | Kim et al. |
| 6,078,331 A | 6/2000 | Pulli et al. |
| 6,118,547 A | 9/2000 | Tanioka |
| 6,141,740 A | 10/2000 | Mahalingaiah et al. |
| 6,151,457 A | 11/2000 | Kawamoto |
| 6,175,430 B1 | 1/2001 | Ito |
| 6,252,611 B1 | 6/2001 | Kondo |
| 6,281,931 B1 | 8/2001 | Tsao et al. |
| 6,289,103 B1 | 9/2001 | Sako et al. |
| 6,314,493 B1 | 11/2001 | Luick |
| 6,319,682 B1 | 11/2001 | Hochman |
| 6,323,934 B1 | 11/2001 | Enomoto |
| 6,392,216 B1 | 5/2002 | Peng-Tan |
| 6,396,397 B1 | 5/2002 | Bos et al. |
| 6,438,664 B1 | 8/2002 | McGrath et al. |
| 6,486,971 B1 | 11/2002 | Kawamoto |
| 6,504,952 B1 | 1/2003 | Takemura et al. |
| 6,584,202 B1 | 6/2003 | Montag et al. |
| 6,594,388 B1 | 7/2003 | Gindele et al. |
| 6,683,643 B1 | 1/2004 | Takayama et al. |
| 6,707,452 B1 | 3/2004 | Veach |
| 6,724,423 B1 | 4/2004 | Sudo |
| 6,724,932 B1 | 4/2004 | Ito |
| 6,737,625 B2 | 5/2004 | Baharav et al. |
| 6,760,080 B1 | 7/2004 | Moddel et al. |
| 6,785,814 B1 | 8/2004 | Usami et al. |
| 6,806,452 B2 | 10/2004 | Bos et al. |
| 6,839,062 B2 | 1/2005 | Aronson et al. |
| 6,856,441 B2 | 2/2005 | Zhang et al. |
| 6,891,543 B2 | 5/2005 | Wyatt |
| 6,900,836 B2 | 5/2005 | Hamilton, Jr. |
| 6,950,099 B2 | 9/2005 | Stollnitz et al. |
| 7,009,639 B1 | 3/2006 | Une et al. |
| 7,015,909 B1 | 3/2006 | Morgan, III et al. |
| 7,023,479 B2 | 4/2006 | Hiramatsu et al. |
| 7,088,388 B2 | 8/2006 | MacLean et al. |
| 7,092,018 B1 | 8/2006 | Watanabe |
| 7,106,368 B2 | 9/2006 | Daiku et al. |
| 7,133,072 B2 | 11/2006 | Harada |
| 7,146,041 B2 | 12/2006 | Takahashi |
| 7,221,779 B2 | 5/2007 | Kawakami et al. |
| 7,227,586 B2 | 6/2007 | Finlayson et al. |
| 7,245,319 B1 | 7/2007 | Enomoto |
| 7,305,148 B2 | 12/2007 | Spampinato et al. |
| 7,343,040 B2 | 3/2008 | Chanas et al. |
| 7,486,844 B2 | 2/2009 | Chang et al. |
| 7,502,505 B2 | 3/2009 | Malvar et al. |
| 7,580,070 B2 | 8/2009 | Yanof et al. |
| 7,626,612 B2 | 12/2009 | John et al. |
| 7,627,193 B2 | 12/2009 | Alon et al. |
| 7,671,910 B2 | 3/2010 | Lee |
| 7,728,880 B2 | 6/2010 | Hung et al. |
| 7,750,956 B2 | 7/2010 | Wloka |
| 7,817,187 B2 | 10/2010 | Silsby et al. |
| 7,859,568 B2 | 12/2010 | Shimano et al. |
| 7,860,382 B2 | 12/2010 | Grip |
| 7,912,279 B2 | 3/2011 | Hsu et al. |
| 8,049,789 B2 | 11/2011 | Innocent |
| 8,456,547 B2 | 6/2013 | Wloka |
| 8,456,548 B2 | 6/2013 | Wloka |
| 8,456,549 B2 | 6/2013 | Wloka |
| 8,471,852 B1 | 6/2013 | Bunnell |
| 2001/0001234 A1 | 5/2001 | Addy et al. |
| 2001/0012113 A1 | 8/2001 | Yoshizawa et al. |
| 2001/0012127 A1 | 8/2001 | Fukuda et al. |
| 2001/0015821 A1 | 8/2001 | Namizuka et al. |
| 2001/0019429 A1 | 9/2001 | Oteki et al. |
| 2001/0021278 A1 | 9/2001 | Fukuda et al. |
| 2001/0033410 A1 | 10/2001 | Helsel et al. |
| 2001/0050778 A1 | 12/2001 | Fukuda et al. |
| 2001/0054126 A1 | 12/2001 | Fukuda et al. |
| 2002/0012131 A1 | 1/2002 | Oteki et al. |
| 2002/0015111 A1 | 2/2002 | Harada |
| 2002/0018244 A1 | 2/2002 | Namizuka et al. |
| 2002/0027670 A1 | 3/2002 | Takahashi et al. |
| 2002/0033887 A1 | 3/2002 | Hieda et al. |
| 2002/0041383 A1 | 4/2002 | Lewis, Jr. et al. |
| 2002/0044778 A1 | 4/2002 | Suzuki |
| 2002/0054374 A1 | 5/2002 | Inoue et al. |
| 2002/0063802 A1 | 5/2002 | Gullichsen et al. |
| 2002/0105579 A1 | 8/2002 | Levine et al. |
| 2002/0126210 A1 | 9/2002 | Shinohara et al. |
| 2002/0146136 A1 | 10/2002 | Carter, Jr. |
| 2002/0149683 A1 | 10/2002 | Post |
| 2002/0158971 A1 | 10/2002 | Daiku et al. |
| 2002/0167202 A1 | 11/2002 | Pfalzgraf |
| 2002/0167602 A1 | 11/2002 | Nguyen |
| 2002/0191694 A1 | 12/2002 | Ohyama et al. |
| 2002/0196470 A1 | 12/2002 | Kawamoto et al. |
| 2003/0035100 A1 | 2/2003 | Dimsdale et al. |
| 2003/0067461 A1 | 4/2003 | Fletcher et al. |
| 2003/0122825 A1 | 7/2003 | Kawamoto |
| 2003/0142222 A1 | 7/2003 | Hordley |
| 2003/0146975 A1 | 8/2003 | Joung et al. |
| 2003/0169353 A1 | 9/2003 | Keshet et al. |
| 2003/0169918 A1 | 9/2003 | Sogawa |
| 2003/0197701 A1 | 10/2003 | Teodosiadis et al. |
| 2003/0218672 A1 | 11/2003 | Zhang et al. |
| 2003/0222995 A1 | 12/2003 | Kaplinsky et al. |
| 2003/0223007 A1 | 12/2003 | Takane |
| 2004/0001061 A1 | 1/2004 | Stollnitz et al. |
| 2004/0001234 A1 | 1/2004 | Curry et al. |
| 2004/0032516 A1 | 2/2004 | Kakarala |
| 2004/0066970 A1 | 4/2004 | Matsugu |
| 2004/0100588 A1 | 5/2004 | Hartson et al. |
| 2004/0101313 A1 | 5/2004 | Akiyama |
| 2004/0109069 A1 | 6/2004 | Kaplinsky et al. |
| 2004/0189875 A1 | 9/2004 | Zhai et al. |
| 2004/0218071 A1 | 11/2004 | Chauville et al. |
| 2004/0247196 A1 | 12/2004 | Chanas et al. |
| 2005/0007378 A1 | 1/2005 | Grove |
| 2005/0007477 A1 | 1/2005 | Ahiska |
| 2005/0030395 A1 | 2/2005 | Hattori |
| 2005/0046704 A1 | 3/2005 | Kinoshita |
| 2005/0099418 A1 | 5/2005 | Cabral et al. |
| 2005/0175257 A1 | 8/2005 | Kuroki |
| 2005/0185058 A1 | 8/2005 | Sablak |
| 2005/0238225 A1 | 10/2005 | Jo et al. |
| 2005/0243181 A1 | 11/2005 | Castello et al. |
| 2005/0248671 A1 | 11/2005 | Schweng |
| 2005/0261849 A1 | 11/2005 | Kochi et al. |
| 2005/0286097 A1 | 12/2005 | Hung et al. |
| 2006/0050158 A1 | 3/2006 | Irie |
| 2006/0061658 A1 | 3/2006 | Faulkner et al. |
| 2006/0087509 A1 | 4/2006 | Ebert et al. |
| 2006/0119710 A1 | 6/2006 | Ben-Ezra et al. |
| 2006/0133697 A1 | 6/2006 | Uvarov et al. |
| 2006/0176375 A1 | 8/2006 | Hwang et al. |
| 2006/0197664 A1 | 9/2006 | Zhang et al. |
| 2006/0274171 A1 | 12/2006 | Wang |
| 2006/0290794 A1 | 12/2006 | Bergman et al. |
| 2006/0293089 A1 | 12/2006 | Herberger et al. |
| 2007/0091188 A1 | 4/2007 | Chen et al. |
| 2007/0147706 A1 | 6/2007 | Sasaki et al. |
| 2007/0171288 A1 | 7/2007 | Inoue et al. |
| 2007/0236770 A1 | 10/2007 | Doherty et al. |
| 2007/0247532 A1 | 10/2007 | Sasaki |
| 2007/0285530 A1 | 12/2007 | Kim et al. |
| 2008/0030587 A1 | 2/2008 | Helbing |
| 2008/0062164 A1 | 3/2008 | Bassi et al. |
| 2008/0101690 A1 | 5/2008 | Hsu et al. |
| 2008/0143844 A1 | 6/2008 | Innocent |
| 2008/0231726 A1 | 9/2008 | John |
| 2009/0002517 A1 | 1/2009 | Yokomitsu et al. |
| 2009/0010539 A1 | 1/2009 | Guarnera et al. |
| 2009/0116750 A1 | 5/2009 | Lee et al. |

(56) References Cited

U.S. PATENT DOCUMENTS

| | | |
|---|---|---|
| 2009/0160957 A1 | 6/2009 | Deng et al. |
| 2009/0257677 A1* | 10/2009 | Cabral et al. ............... 382/274 |
| 2010/0266201 A1* | 10/2010 | Cabral et al. ............... 382/167 |

FOREIGN PATENT DOCUMENTS

| | | |
|---|---|---|
| EP | 1447977 | 8/2004 |
| EP | 1550980 | 7/2005 |
| GB | 2045026 | 10/1980 |
| GB | 2363018 | 12/2001 |
| JP | 61187467 | 8/1986 |
| JP | 62151978 | 7/1987 |
| JP | 8036640 | 2/1996 |
| JP | 08-079622 | 3/1996 |
| JP | 2000516752 | 12/2000 |
| JP | 2001052194 | 2/2001 |
| JP | 2002-207242 | 7/2002 |
| JP | 2003-085542 | 3/2003 |
| JP | 2004-221838 | 8/2004 |
| JP | 2005094048 | 4/2005 |
| JP | 2005-182785 | 7/2005 |
| JP | 2006086822 | 3/2006 |
| JP | 2006-094494 | 4/2006 |
| JP | 2006121612 | 5/2006 |
| JP | 2006134157 | 5/2006 |
| JP | 2007019959 | 1/2007 |
| JP | 2007-148500 | 6/2007 |
| JP | 2007-233833 | 9/2007 |
| JP | 2007282158 | 10/2007 |
| JP | 2008085388 | 4/2008 |
| JP | 2008113416 | 5/2008 |
| JP | 2008277926 | 11/2008 |
| KR | 1020060068497 | 6/2006 |
| KR | 1020070004202 | 1/2007 |
| WO | 03043308 | 5/2003 |
| WO | 2004063989 | 7/2004 |
| WO | 2007093864 | 8/2007 |

OTHER PUBLICATIONS

D. Doo, M. Sabin, "behaviour of recursive division surfaces near extraordinary points"; Sep. 1978; Computer Aided Design; vol. 10, pp. 356-360.

D. W. H. Doo; "A subdivision algorithm for smoothing down irregular shaped polyhedrons"; 1978; Interactive Techniques in Computer Aided Design; pp. 157-165.

Davis, J., Marschner, S., Garr, M., Levoy, M., Filling holes in complex surfaces using volumetric diffusion, Dec. 2001, Stanford University, pp. 1-9.

E. Catmull, J.Clark, "recursively generated B-Spline surfaces on arbitrary topological meshes"; Nov. 1978; Computer aided design; vol. 10; pp. 350-355.

J. Bolz, P. Schroder; "rapid evaluation of catmull-clark subdivision surfaces"; Web 3D '02.

J. Stam; "Exact Evaluation of Catmull-clark subdivision surfaces at arbitrary parameter values"; Jul. 1998; Computer Graphics; vol. 32; pp. 395-404.

Krus, M., Bourdot, P., Osorio, A., Guisnel, F., Thibault, G., Adaptive tessellation of connected primitives for interactive walkthroughs in complex industrial virtual environments, Jun. 1999, Proceedings of the Eurographics workshop, pp. 1-10.

Kumar, S., Manocha, D., Interactive display of large scale trimmed NURBS models, 1994, University of North Carolina at Chapel Hill, Technical Report, pp. 1-36.

Loop, C., DeRose, T., Generalized B-Spline surfaces of arbitrary topology, Aug. 1990, SIGRAPH 90, pp. 347-356.

M. Halstead, M. Kass, T. DeRose; "efficient, fair interpolation using catmull-clark surfaces"; Sep. 1993; Computer Graphics and Interactive Techniques, Proc; p. 35-44.

T. DeRose, M. Kass, T. Truong; "subdivision surfaces in character animation"; Jul. 1998; Computer Graphics and Interactive Techniques, Proc; pp. 85-94.

Takeuchi, S., Kanai, T., Suzuki, H., Shimada, K., Kimura, F., Subdivision surface fitting with QEM-based mesh simplification and reconstruction of approximated B-spline surfaces, 2000, Eighth Pacific Conference on computer graphics and applications, pp. 202-212.

"A Pipelined Architecture for Real-Time Correction of Barrel Distortion in Wide-Angle Camera Images", Hau, T. Ngo, Student Member, IEEE and Vijayan K. Asari, Senior Member IEEE, IEEE Transaction on Circuits and Systems for Video Technology: vol. 15 No. 3 Mar. 2005 pp. 436-444.

"Calibration and removal of lateral chromatic aberration in images" Mallon, et al. Science Direct Copyright 2006; 11 pages.

"Method of Color Interpolation in a Single Sensor Color Camera Using Green Channel Seperation" Weerasighe, et al Visual Information Processing Lab, Motorola Australian Research Center pp. IV-3233-IV3236, 2002.

Kuno et al. "New Interpolation Method Using Discriminated Color Correlation for Digital Still Cameras" IEEE Transac. on Consumer Electronics, vol. 45, No. 1, Feb. 1999, pp. 259-267.

Donald D. Spencer, "Illustrated Computer Graphics Dictionary", 1993, Camelot Publishing Company, p. 272.

Duca et al., "A Relational Debugging Engine for Graphics Pipeline, International Conference on Computer Graphics and Interactive Techniques", ACM SIGGRAPH Jul. 2005, pp. 453-463.

Keith R. Slavin; Application as Filed entitled "Efficient Method for Reducing Noise and Blur in a Composite Still Image From a Rolling Shutter Camera"; U.S. Appl. No. 12/069,669, filed Feb. 11, 2008.

Ko et al., "Fast Digital Image Stabilizer Based on Gray-Coded Bit-Plane Matching", IEEE Transactions on Consumer Electronics, vol. 45, No. 3, pp. 598-603, Aug. 1999.

Ko, et al., "Digital Image Stabilizing Algorithms Based on Bit-Plane Matching", IEEE Transactions on Consumer Electronics, vol. 44, No. 3, pp. 617-622, Aug. 1988.

Morimoto et al., "Fast Electronic Digital Image Stabilization for Off-Road Navigation", Computer Vision Laboratory, Center for Automated Research University of Maryland, Real-Time Imaging, vol. 2, pp. 285-296, 1996.

Paik et al., "An Adaptive Motion Decision system for Digital Image Stabilizer Based on Edge Pattern Matching", IEEE Transactions on Consumer Electronics, vol. 38, No. 3, pp. 607-616, Aug. 1992.

Parhami, Computer Arithmetic, Oxford University Press, Jun. 2000, pp. 413-418.

S. Erturk, "Digital Image Stabilization with Sub-Image Phase Correlation Based Global Motion Estimation", IEEE Transactions on Consumer Electronics, vol. 49, No. 4, pp. 1320-1325, Nov. 2003.

S. Erturk, "Real-Time Digital Image Stabilization Using Kalman Filters", http://www.ideallibrary.com, Real-Time Imaging 8, pp. 317-328, 2002.

Uomori et al., "Automatic Image Stabilizing System by Full-Digital Signal Processing", vol. 36, No. 3, pp. 510-519, Aug. 1990.

Uomori, et al., "Electronic Image Stabilization System for Video Cameras and VCRS", J. Soc. Motion Pict. Telev. Eng., vol. 101, pp. 66-75, 1992.

Goshtasby, Ardeshir, "Correction of Image Distortion From Lens Distortion Using Bezier Patches", 1989, Computer Vision, Graphics and Image Processing, vol. 47, pp. 358-394.

* cited by examiner

SYSTEM AND METHOD FOR LENS SHADING IMAGE CORRECTION

RELATED U.S. APPLICATIONS

This application claims the benefit of and priority to the copending provisional patent application Ser. No. 61/170,014, entitled "SYSTEM AND METHOD FOR IMAGE CORRECTION," with filing date Apr. 16, 2009, and hereby incorporated by reference in its entirety.

This application is related to copending non-provisional patent application, Ser. No. 12/753,775, entitled "SYSTEM AND METHOD FOR PERFORMING IMAGE CORRECTION," with filing date Apr. 2, 2010, and hereby incorporated by reference in its entirety.

This application is continuation-in-part of and claims the benefit of and priority to the copending non-provisional patent application Ser. No. 12/101,142, entitled "PER-CHANNEL IMAGE INTENSITY CORRECTION," with filing date Apr. 10, 2008.

FIELD OF THE INVENTION

Embodiments of the present invention are generally related to digital image signal processing.

BACKGROUND OF THE INVENTION

As technology has advanced, cameras have advanced accordingly but still face certain persistent issues. Particularly, as light passes through a camera lens, the light is bent as the light refracts. This bending of light results in inconsistent brightness across the sensor such that areas in the middle are much brighter than areas on the edges. This distortion is known as lens shading or vignetting. Variations or imperfections in the lens have an increasing impact on the inconsistency of light coming out of the lens. Further, light may get stuck or not pass through as a result of interacting with the lens housing. Thus, light coming through a lens system and forming an image on a film plane (digital sensor or film) will be unevenly attenuated across the image plane and color spectrum due to imperfections in the lens and image forming medium (film or digital array of sensors). The overall result is that if a "flat" field of light enters the lens, then the film or digital sensor nevertheless receives an "unflat" field of light with varying brightness.

Conventionally, a high order polynomial may be used to represent this distortion and can be applied across the image plane to attempt to overcome the impact of lens shading and lens imperfections thereby correcting the image. However, the high order polynomials are computationally expensive and are complicated to execute on hardware of fixed precision. For example, a $10^{th}$ power polynomial may have 100 individual terms and a high order polynomial may require evaluation at each pixel meaning that, for instance, after 20 pixels, the amount of computations required increases rapidly. Further, higher order polynomials are numerically unstable as small variations can result in large changes in the polynomial. Also, as one moves around a surface defined by a polynomial to the $9^{th}$ or $10^{th}$ order, the polynomial coefficients provide little intuition as to the magnitude of the changes in the surface value in any direction. All these characteristics make polynomial representation not a viable solution for the lens shading problem in terms of being computationally intensive and not intuitive.

SUMMARY OF THE INVENTION

Accordingly, what is needed is a system for correcting image data from lens shading effects in an efficient manner. Embodiments provide for determining calibration data operable to be used for correcting image data (e.g., to overcome lens shading, misshapen lenses and other effects). Embodiments of present invention further provide for using the calibration data in a process of correcting image data for lens shading effects. In one embodiment, the correction of image data is performed via utilization of a spline surfaces (e.g., Bezier surface). The use of spline surfaces facilitates efficient hardware implementations and provides an intuitive and computationally stable selection. The image correction may be performed on a per channel and illumination type basis.

In one embodiment, the present invention is a computer implemented method for image signal processing. The method includes receiving image data which may be received from an optical image sensor associated with a camera lens (e.g., CMOS sensor or CCD sensor) and includes data for one or more color channels. A Bezier patch array is then accessed specific to the lens and sensor. The Bezier patch array includes control points of a surface which is a reciprocal function of detected lens shading. The Bezier patch array is utilized with the image data to produce corrected image data. The corrected image data is thus corrected for a variety of effects including lens shading and lens imperfections, etc.

In another embodiment, the present invention is implemented as an image signal processing system. The system includes an optical sensor (e.g., CMOS sensor or CCD sensor) operable to capture light information and a processing unit operable to receive image signal data in an ordered format from the optical sensor. The processing unit is further operable to process the image signal data to correct an image based on a plurality of values reflecting a reciprocal surface. The reciprocal surface may have been determined by calibration embodiments described herein. The system further includes a channel selector for selecting a channel image signal (e.g., red, greens, or blue) for the processing unit to receive and a memory operable to store a plurality of correction data (e.g., specific reciprocal surfaces) comprising correction information for each of a plurality of color channels. The memory may further store correction information (e.g., specific reciprocal surfaces) for each of a plurality of illumination types (e.g., fluorescent, tungsten or incandescent, daylight or the like). The reciprocal surfaces may be multiple patches of a Bezier surface.

In another embodiment, the present invention is implemented as a method for calibrating an image signal processor. The method includes receiving light from a uniform field and sampling the light with a digital optical sensor associated with a lens. The method further includes determining a plurality of reciprocal values for each location (e.g., pixel) corresponding to the uniform field. Based on the reciprocal values, a plurality of control points is determined. The control points define a reciprocal surface based on the plurality of reciprocal values and the reciprocal surface is operable to be used for correcting an image e.g., correcting lens shading effects. For example, the calibration facilitates overcoming of lens shading and lens imperfection effects. In one embodiment, the reciprocal surface is represented as a multiple number of patches of a Bezier surface.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Figure 1:
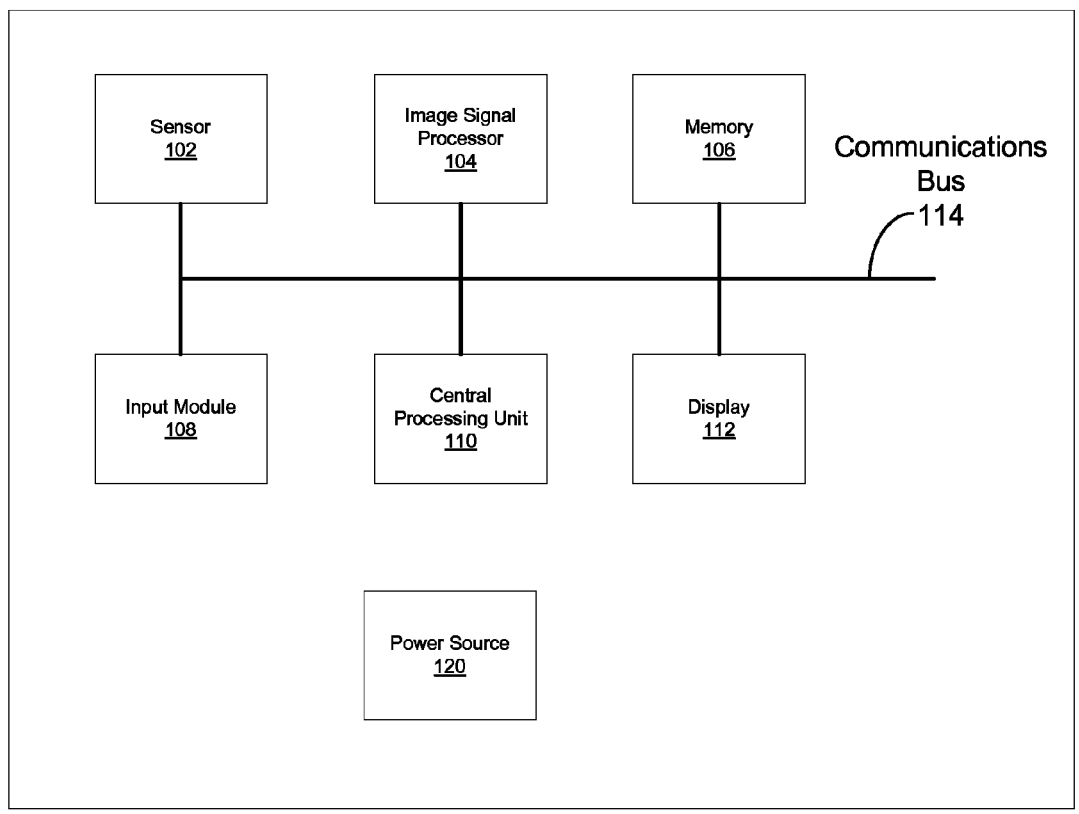
FIG. 1 shows an exemplary operating environment in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.
Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of an integrated circuit (e.g., computing system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Operating Environment:

FIG. 1 shows an exemplary operating environment in accordance with one embodiment of the present invention. System 100 includes sensor 102, image signal processor (ISP) 104, memory 106, input module 108, central processing unit (CPU) 110, display 112, communications bus 114, and power source 120. Power source 120 provides power to system 100 and may be a DC or AC power source. System 100 depicts the components of a basic system in accordance with embodiments of the present invention providing the execution platform for certain hardware-based and software-based functionality. Although specific components are disclosed in system 100, it should be appreciated that such components are examples. That is, embodiments of the present invention are well suited to having various other components or variations of the components recited in system 100. It is appreciated that the components in system 100 may operate with other components other than those presented, and that not all of the components of system 100 may be required to achieve the goals of system 100.

CPU 110 and the ISP 104 can also be integrated into a single integrated circuit die and CPU 110 and ISP 104 may share various resources, such as instruction logic, buffers, functional units and so on, or separate resources may be provided for image processing and general-purpose operations. System 100 can be implemented as, for example, a digital camera, cell phone camera, portable device (e.g., audio device, entertainment device, handheld device), webcam, video device (e.g., camcorder) and the like.

Sensor 102 receives light via a lens (not shown) and converts the light received into a signal (e.g., digital or analog). Sensor 102 may be any of a variety of optical sensors including, but not limited to, complementary metal-oxide-semiconductor (CMOS) or charge-coupled device (CCD) sensors. Sensor 102 is coupled to communications bus 114 and may provide image data received over communications bus 114.

Image signal processor (ISP) 104 is coupled to communications bus 114 and processes the signal generated by sensor 102. More specifically, image signal processor 104 processes data from sensor 102 for storing in memory 106. For example, image signal processor 104 may compress and determine a file format for an image to be stored in within memory 106.

Input module 108 allows entry of commands into system 100 which may then, among other things, control the sampling of data by sensor 102 and subsequent processing by ISP 104. Input module 108 may include, but it not limited to, navigation pads, keyboards (e.g., QWERTY), up/down buttons, touch screen controls (e.g., via display 112) and the like.

Central processing unit (CPU) 110 receives commands via input module 108 and may control a variety of operations including, but not limited to, sampling and configuration of sensor 102, processing by ISP 104, and management (e.g., addition, transfer, and removal) of images and/or video from memory 106.

Embodiments of present invention provide for correction of image data. Embodiments further provide for calibration of data operable to be used for correcting image data (e.g., to overcome lens shading, misshapen lenses, and other effects). In one embodiment, the correction of image data is performed via utilization of a spline surface (e.g., Bezier surface). The use of spline surfaces facilitates efficient hardware implementation. The image correction may be performed on a per channel and illumination type basis or combination thereof.

Figure 2A:
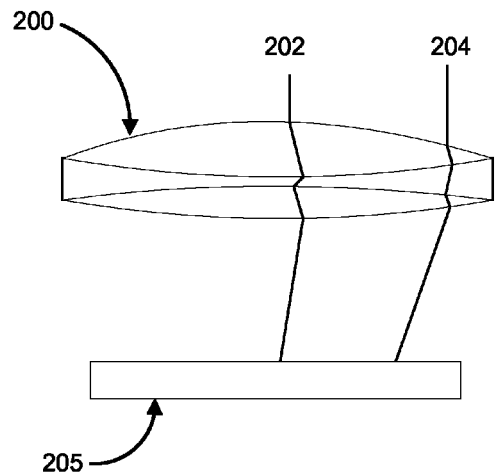
FIG. 2a shows a block diagram of an exemplary lens operable to be used with one embodiment of the present invention.

FIG. 2a shows a block diagram of an exemplary lens operable to be used with one embodiment of the present invention. Lens 200 is a lens operable to be used in an image or video capture device (e.g., camera, digital camera, webcam, camcorder, portable device, cell phone, and the like). Lens 200 may be made of a variety of materials including, but not limited to, glass, plastic, or a combination thereof. Light ray 202 enters lens 200 substantially near the center of lens 200. Light ray 202 is bent as light ray 202 is refracted as it passes through lens 200. Light ray 204 enters lens 200 substantially near an edge of lens 200. As substantially illustrated, light ray 204 is bent by a substantially greater amount than light ray 202 thereby resulting at the sensor 205 in a difference in brightness between light received substantially near the center of lens 200 and the edge of lens 200. This distortion is known as lens shading or vignetting.

Figure 2B:
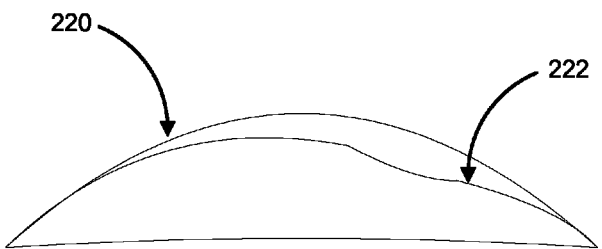
FIG. 2b shows a block diagram of another exemplary lens operable to be used with one embodiment of the present invention.

FIG. 2b shows a block diagram of an exemplary lens operable to be used with one embodiment of the present invention. Line 220 depicts a well shaped lens (e.g., lens 200). Lens 222 depicts a misshapen lens which may be more realistic of a lens in a variety of devices. It is appreciated that the effects of misshapen lens 222 may further impact the bending of light as it passes through lens 222. Embodiments of the present invention compensate and overcome the effects of light being bent by the lens and irregularities in the shape of lenses (e.g., lens 222). It is appreciated that lenses may have a variety of defects including, but not limited to, lopsidedness and waviness. It is further appreciated that variations in manufacturing processes of a lens can alter the location of the brightest spot. Of particular note, portable devices (e.g., cell phones) and low cost devices may have lenses that are plastic and not well constructed.

Figure 3A:
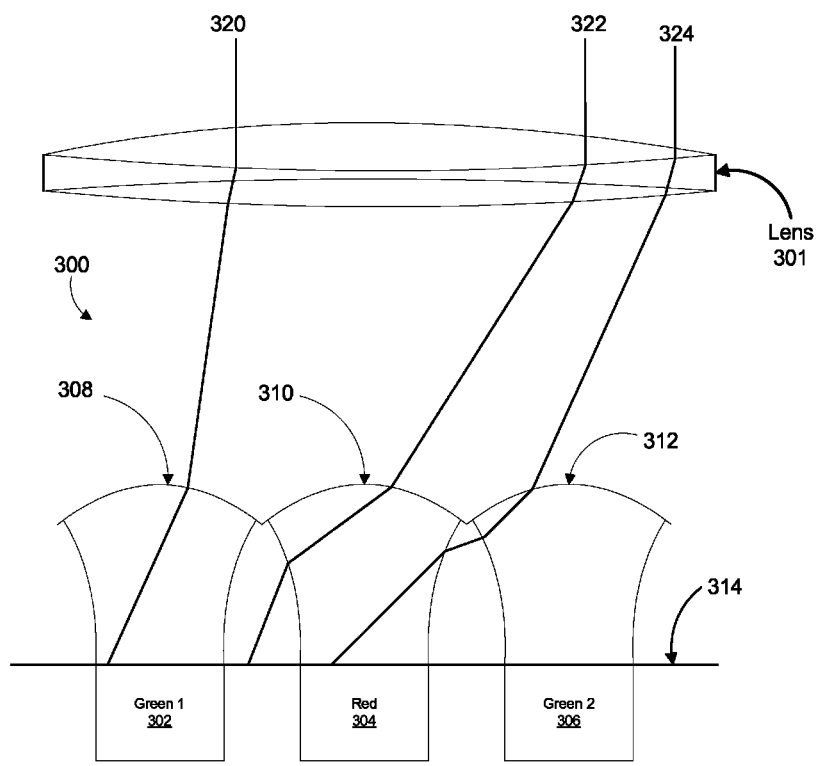
FIG. 3A shows a diagram of an exemplary color filter array in accordance with one embodiment of the present invention.

FIG. 3A shows a diagram of an exemplary color filter array of a sensor device in accordance with one embodiment of the present invention. Color filter array 300 includes substrate 314, green 1 filter 308, red filter 310, green 2 filter 312, green 1 sensor 302, red sensor 304, and green 2 sensor 306. Light is received by color filter array 300 via lens 301. Sensors 302-306 may be part of a CMOS sensor operable to capture images and arranged in a Bayer filter configuration however any color configuration can be used. It is appreciated that green filters 308 and 312 may filter different spectra of green light on green sensors 302 and 306, respectively.

Embodiments of the present invention compensate for bending of light as light of different colors passes through a lens and falls on a color filter array (e.g., color filters 308-312 and sensor array 300). For example, light ray 320 is bent due to light ray 320 being refracted as it passes through lens 301 and green 1 filter 308. Embodiments of the present invention are further operable to compensate for optical crosstalk. Optical crosstalk can occur when light rays are bent as the light ray is refracted as it passes through more than one color filter prior to reaching a sensor. For example, light ray 324 is bent due to being refracted as it passes through lens 301, green 2 filter 312, and then red filter 310 then reaches red sensor 304. It is noted that as light ray 324 passes through red filter 310 and green 2 filter 312, light ray is filtered in a manner not intended by the design of color filter array 300.

Embodiments of the present invention are further operable to compensate for electrical crosstalk. Electrical crosstalk can occur when light rays are bent and reach the material between sensors. For example, light ray 322 is bent due to being refracted upon passing through lens 301 and red filter 310 and then reaches substrate 314. Upon reaching substrate 314, photons of light ray 322 may impact the performance of sensors (e.g., green 1 sensor 302 and red sensor 304). Such impacts may include increasing electrical leakage among components of sensors 302 and 304 (e.g., well leakage).

It is appreciated that embodiments of the present invention may correct image data for a variety of sensor configurations including, but not limited to, panchromatic cells and vertical color filters. It is further appreciated that different types of lighting e.g., of different color temperature, may result in different bending of light as light goes through filters 308-312. Therefore, embodiments determine and use different sets of control points per illuminate. For example, embodiments may utilize a different set of control points for each illuminate (e.g., florescent, tungsten, and daylight) for each color channel.

Figure 3B:
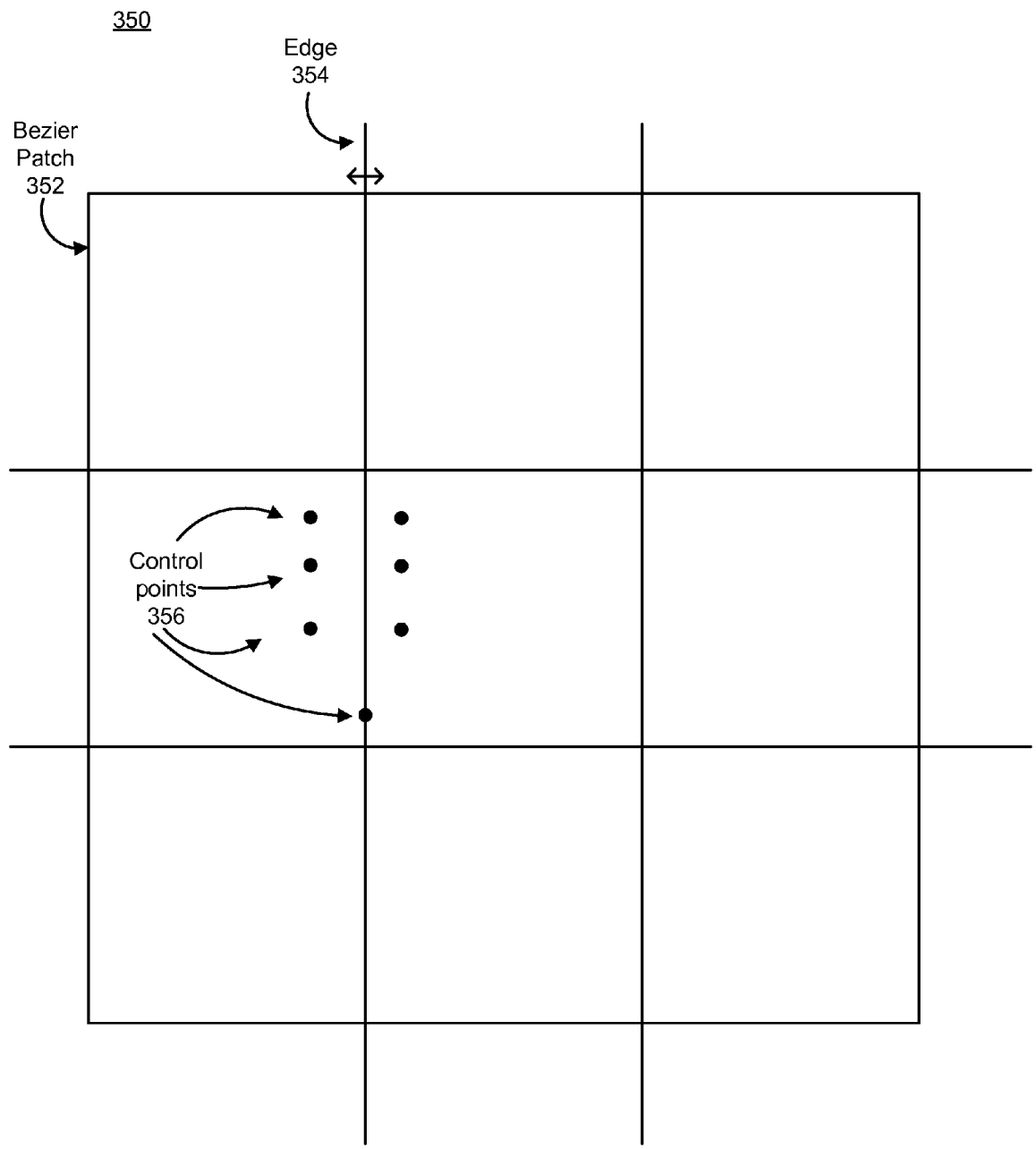
FIG. 3B show a block diagram an exemplary Bezier surface of patches in accordance with one embodiment of the present invention.

FIG. 3B show a block diagram an exemplary Bezier surface of patches in accordance with one embodiment of the present invention. Bezier surface 350 includes a plurality of patches, for instance Bezier patch 352. In one embodiment, Bezier surface 350 includes nine Bezier patches. Bezier patches are coupled together along boundaries or edges, for instance edge 354. As described herein, the edges of Bezier patches may be adjustable or configurable (e.g., based on the complexity of Bezier surface 350). Each Bezier patch further includes control points, for instance control points 356. Control points define the shape of each Bezier patch. The control points may be on boundaries of Bezier patches and thus may be shared between Bezier patches.

Figure 4:
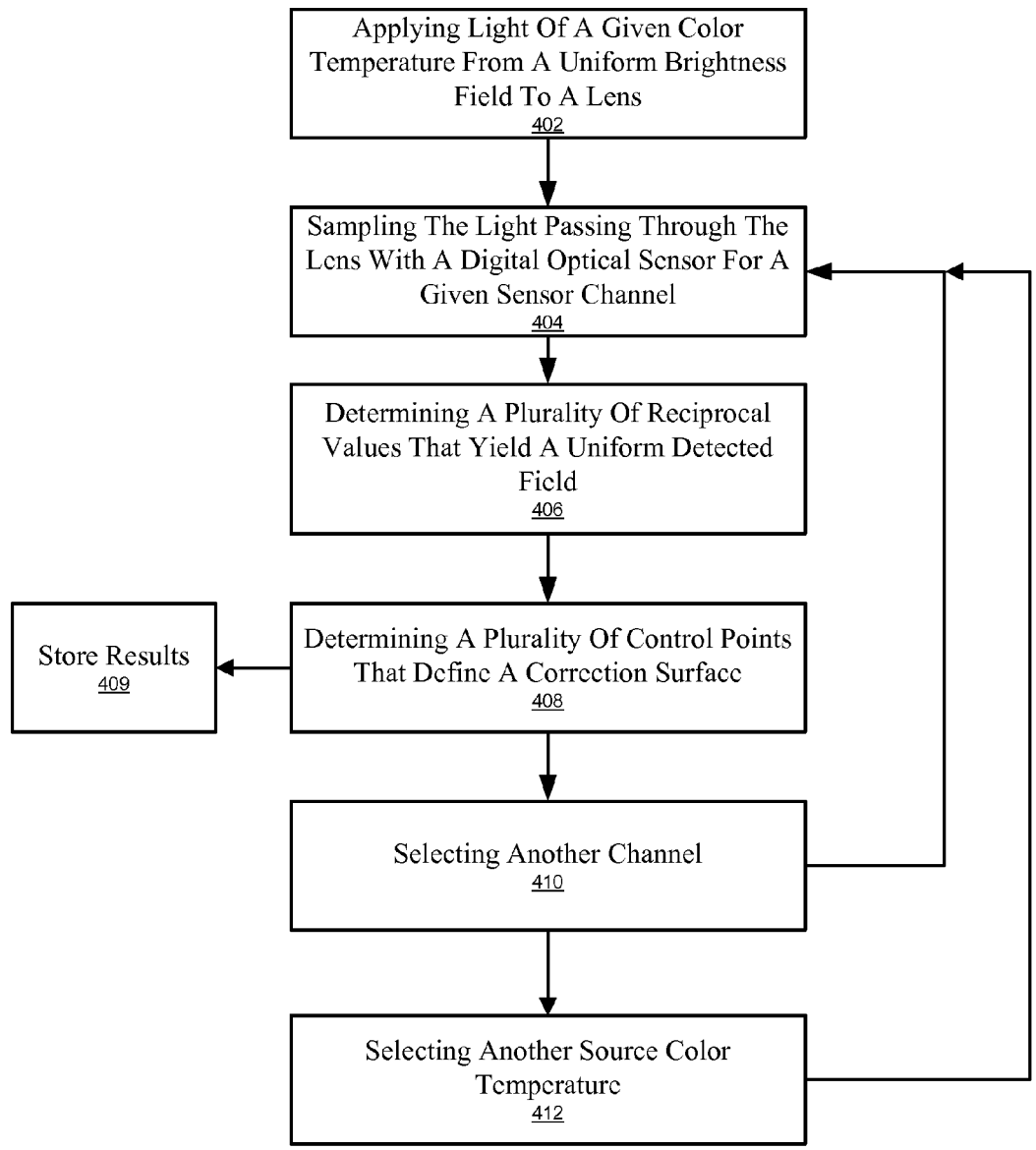
FIG. 4 shows a flowchart of an exemplary computer controlled process for calibrating an image signal processor in accordance with one embodiment.
Figure 6:
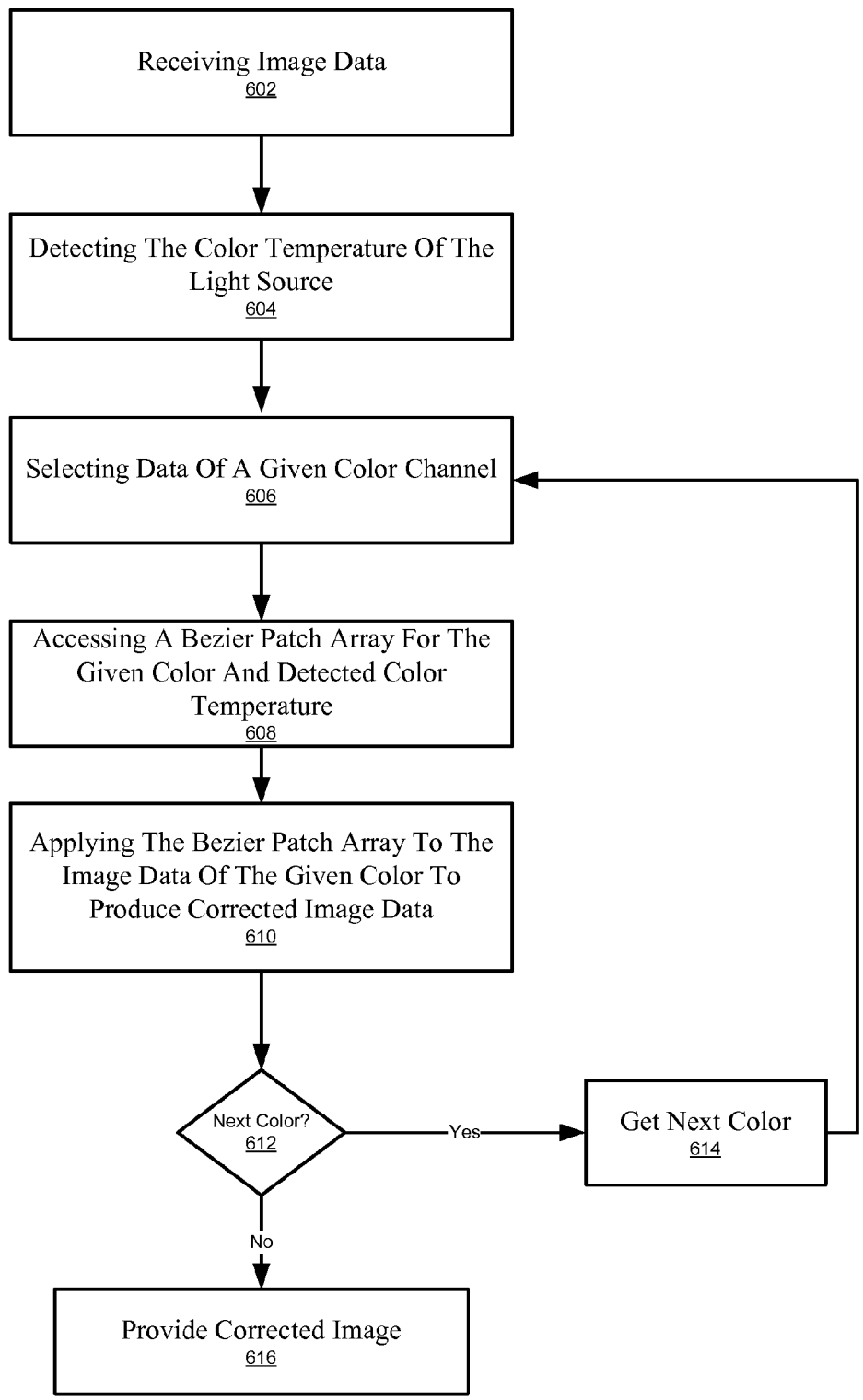
FIG. 6 shows a flowchart of an exemplary computer controlled process for image signal processing in accordance with one embodiment of the present invention.

With reference to FIGS. 4 and 6, flowcharts 400 and 600 illustrate example functions used by various embodiments of the present invention. Although specific function blocks ("blocks") are disclosed in flowcharts 400 and 600, such steps are examples. That is, embodiments are well suited to performing various other blocks or variations of the blocks recited in flowcharts 400 and 600. It is appreciated that the blocks in flowcharts 400 and 600 may be performed in an order different than presented, and that not all of the blocks in flowcharts 400 and 600 may be performed.

FIG. 4 shows a flowchart of an exemplary computer controlled process for calibrating an image signal processor e.g., to produce color specific Bezier patches used to correct for lens shading effects. The process of flowchart 400 may be used for calibrating image correction for each color channel and various lighting conditions, e.g., color temperatures. It is appreciated that calibration may be performed on a per color channel basis because each color of light is impacted differently (e.g., bent) by the lenses (e.g., lens 200). The process of flowchart 400 may determine a set of control points which define a calibration surface and are operable to be used by an image signal processor in correcting image data. For example, for a Bayer filter arrangement, a respective calibration surface may determined for each of the red, green 1, green 2, and blue channels. Also each of the 4 calibration surfaces above may be particular to a given color temperature. The calibration or correction surfaces are each multiple patches of Bezier surfaces. The data represents reciprocal values for correcting for lens shading effects.

In block 402, light of a given color temperature is applied to a uniform brightness field to a lens. In one embodiment, a specific light source of a given color temperature is selected to illuminate the uniform field (e.g., fluorescent, tungsten, and daylight).

In block 404, the light is sampled with a digital optical sensor for a given sensor channel. The digital optical sensor may be of any design, e.g., a complementary metal-oxide-semiconductor (CMOS) sensor or a charge-coupled device (CCD). It is appreciated that the light received may have been effected (e.g., bent) after passing though the lens (e.g., lens 200) and/or a color filter array (e.g., color filter array 300). The distribution of brightness across the sensor is therefore not uniform, e.g., because of lens shading effects.

In block 406, a plurality of reciprocal values are determined for each sensor location so that the sensor's values and it reciprocal value lead to a uniform field, e.g., one. In other words, the plurality of reciprocal values are determined based on the image values of the uniform field such that when the reciprocal values are applied (e.g., multiplied) to each position (e.g., pixel) the result is a flat field on each pass, for only color sensors of a particular color, e.g., channel.

In block 408, a plurality of control points are determined for the current channel. In one embodiment, the control points define a spline surface based on the plurality of reciprocal values. The surface or "reciprocal surface" is created such that when multiplied by the values from the sensor, the values of the sensor are flattened out so that the original flat field is obtained. The reciprocal surface is operable to be used for correcting an image. For example, the reciprocal surface may provide compensation for the bending of light as it enters a lens (e.g., lens 200), a misshapen lens (e.g., lens 222), or a color filter array (e.g., color filter array 300). The plurality of control points may be determined on a per channel basis (e.g., color channel basis). The plurality of control points may further be determined on an illumination type basis based on the color temperature of the source of light (e.g., florescent, daylight, or incandescent). It is appreciated that the control points represent a compressed form of some higher order surface.

In one embodiment, the reciprocal surface may be a Bezier surface made up of many patches. In one embodiment, the control points are control points for a bi-cubic Bezier surface. The determination of a Bezier surface may be determined by a series of linear interpretations. It is appreciated that the use of a Bezier surface has many desirable properties. For example, if control points are scaled or affine transformations are applied, the effect is the same as applying the transformation to the surface and changes to the surface occur in an intuitive computationally stable manner. In contrast with high order polynomials, application of such transformations would result in weird, non-intuitive changes. Further, Bezier surfaces are separable surfaces meaning that a two dimensional calculation can be solved as two one dimensional calculations, thereby allowing reuse of hardware.

Further, Bezier surfaces, as well as other spline surfaces, exhibit the convex hull property, meaning that the surface is bounded. Embodiments of the present invention are thus well suited for hardware implementations utilizing fixed precision circuits. It is appreciated that use of splines (e.g., Bezier surfaces) overcome the problems associated with high order polynomials (e.g., numerical instability and computationally expensive).

In one embodiment, the Bezier surface may comprise a plurality of Bezier patches. More particularly, the Bezier surface may be divided up into a plurality of patches. For example, a Bezier surface of nine patches per each channel of red, green 1, green 2, and blue may be determined for each illumination type. The number of patches may be variable and be a configurable option. Each patch may be defined by control points. For example, for a cubic Bezier surface there may be 16 control points per patch.

In one embodiment, the control points share internal boundary patches. That is, a portion of the control points are within a boundary of a Bezier patch. The location of control points on boundaries ensures patches join seamlessly. It is appreciated that having control points on the boundaries reduces the overall number of control points. A set of Bezier surfaces and patches may be determined for each color channel and each illumination type. For example, sharing of control points on control boundaries may result in 100 points for a set of 9 patches for each color channel where each patch has 16 control points. It is appreciated that embodiments of the present invention may determine and utilize Bezier patches of any degree.

It is appreciated that the boundaries of the patches can be variably spaced across the sensor surface. For example, boundaries may be moved around according to the surface so that areas where the surface is substantially uneven may have more control points so as to better reflect the shape of the surface. As another example, the boundaries may be selected to correspond to certain areas of a lens being particularly uneven.

At block 409 of FIG. 4, the completed Bezier surface is stored for later use.

At block 410, another color channel is selected. Block 406 may then be performed and a plurality of reciprocal values for the selected channel are computed, etc.

At block 412, a different color temperature source may be selected and the process continues back to block 404. If the three color temperatures are used, e.g., daylight, tungsten, fluorescent, etc., and the four colors are used, e.g., red, green 1, green 2, and blue, then process 400 will define twelve different Bezier surfaces, each with a 100 control points and each having nine patches with sixteen control points per patch (in one example).

Figure 5:
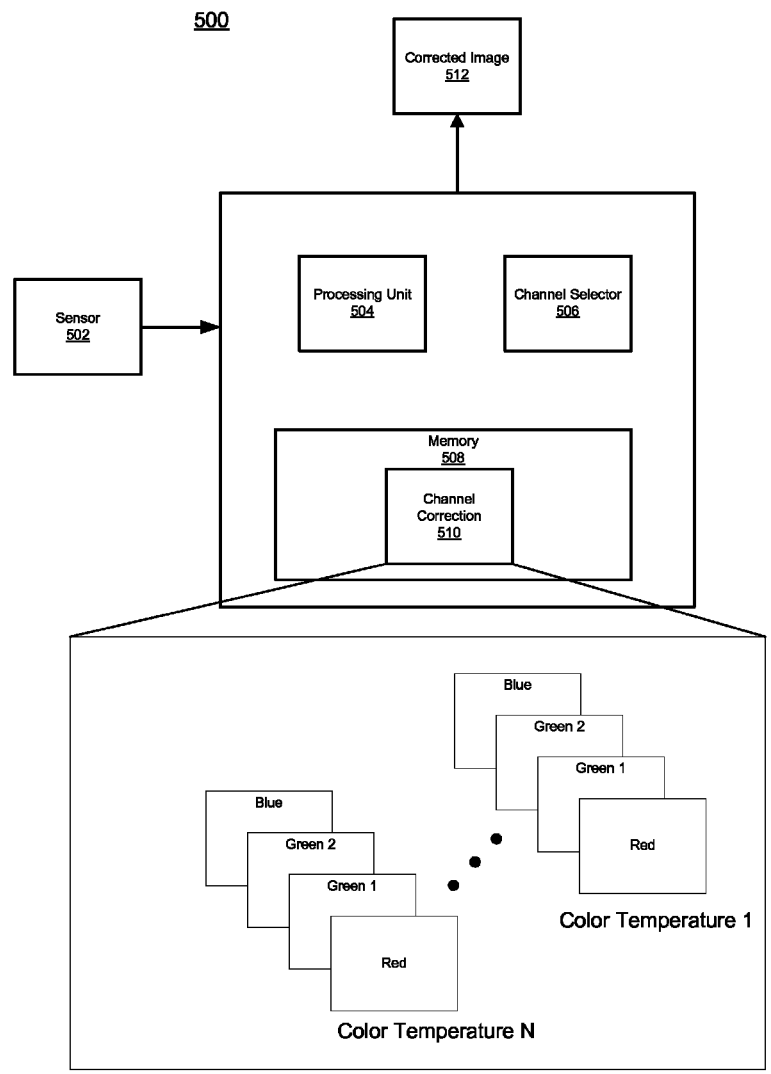
FIG. 5 shows a block diagram of an exemplary system in accordance with one embodiment of the present invention.

FIG. 5 illustrates example components used by various embodiments of the present invention. Although specific components are disclosed in system 500, it should be appreciated that such components are examples. That is, embodiments of the present invention are well suited to having various other components or variations of the components recited in system 500. It is appreciated that the components in system 500 may operate with other components than those presented, and that not all of the components of system 500 may be required to achieve the goals of system 500.

FIG. 5 shows a block diagram of an exemplary system in accordance with one embodiment of the present invention. System 500 includes sensor 502, processing unit 504, channel selector 506, and memory 508. System 500 may correct image information received via sensor 502. System 500 produces corrected image 512.

Memory 508 may include channel correction information 510. Channel correction information 510 may include correction information for each of a plurality of color channels for each of a plurality of light sources. It is appreciated that channel and lighting correction information may be based on variety of splines including, but not limited to, Bezier splines, hermite splines, cubic hermite splines, kochanek-bartels splines, polyharmonic splines, perfect splines, smoothing splines, and thin plate splines.

Optical sensor 502 is an array that is operable to capture light information. Optical sensor 502 may be a complementary metal-oxide-semiconductor (CMOS) sensor or a charge-coupled device (CCD) sensor. Optical sensor 502 sends image information captured as image signal data to processing unit 504. Channel selector 506 selects a color channel of the image signal for processing unit 504 to receive. For example, channel selector 506 may select a red color channel of image data to be received by processing unit 504.

In one embodiment, processing unit 504 may be an image signal processor (e.g. ISP 104). In another embodiment, processing unit 504 may be a programmable device. Processing unit 504 is operable to receive image signal data in an ordered format (e.g., scan line order) and is further operable to processes image signal data to correct an image based on a plurality of values reflecting a reciprocal surface. Processing unit 504 may correct image data based on a reciprocal surface which when applied corrects for the various distortion effects on light as that light travels to optical sensor 502 (e.g., bending of light passing through a lens). As described herein, the reciprocal surface may be a Bezier surface. The Bezier surface may include a plurality of Bezier patches having one or more control points on a boundary of the plurality of Bezier patches. In one embodiment, processing unit 504 corrects the image data on a per color channel basis and a per light source basis.

In one embodiment, processing unit 504 takes advantage of the fact that image data is received in an ordered format. More specifically, processing unit 504 may take advantage of the ordered format by determining a distance from the previous point and how much the reciprocal surface has changed thereby avoiding reevaluating the reciprocal surface at each location (e.g., pixel). Embodiments of the present invention thus take advantage of incoming data coherency.

FIG. 6 shows a flowchart of an exemplary computer controlled process for image signal processing in accordance with one embodiment of the present invention. The process of flowchart 600 may be performed by an ISP (e.g., ISP 104 or processing unit 504 of system 500). The process of flowchart 600 may be implemented in hardware or software. In one embodiment, the blocks of flowchart 600 may be performed early in an ISP pipeline thereby providing a flat field image data to subsequent processing steps.

In block 602, image data is received from a sensor array. In one embodiment, the image data is received from an optical image sensor and the image data comprises data for one or more color channels (e.g., red, green, blue). As described herein, the optical sensor may be a complementary metal-oxide-semiconductor (CMOS) sensor or a charge-coupled device (CCD) sensor. It is appreciated that embodiments of the present invention are able to correct image data independent of the sensor type used.

In block 604, the color temperature of the light source is detected. As described herein, the color temperature may include florescent, tungsten, and daylight.

In block 606, data of a given color channel is selected. As described herein, the color channel may be a red, green 1, green 2, or blue color channel.

In block 608, a Bezier patch array for the given color and the detected color temperature is accessed. In one embodiment, the Bezier patch array comprises control points of a surface which is usable for compensating for lens shading and other effects. For example, the control points may correspond to the reciprocal surface for correcting image data received via a misshapen lens (e.g., lens 222). In one embodiment, the Bezier patch array comprises one or more bi-cubic Bezier patches. As described herein, the Bezier patch array may comprise 100 control points. Further, a portion of the control points may be located on boundaries of a Bezier patch. More specifically, the Bezier patch array may include a Bezier surface for each color channel and a Bezier surface for each illumination type (e.g., tungsten, florescent, or daylight).

In block 606, the Bezier patch array is applied to the image data of the given color to produce corrected image data. The Bezier patch array is utilized to flatten out an image field that was bent by lens (e.g., lens 200 or color filter array 300). As described herein, the Bezier patch array may be used to correct image data on a color channel and illumination basis. For example, image data for a red channel of a pixel with X and Y coordinates may be corrected with the Bezier patch array. The reciprocal value of the Bezier patch is multiplied by the red channel value to obtain a flat field value for the corresponding point in the red channel. Image data for other channels may then be processed in a substantially similar manner with a Bezier surfaces for the corresponding channel.

In block 612, a check is performed if there are more color channels to be processed. If there are more color channels to be processed, block 614 is performed. In block 614, the next color channel is selected for processing.

If there are no more color channels to be processed, block 616 is performed. At block 616, the corrected image data is provided (e.g., to an ISP pipeline for additional processing).

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of image signal processing, said method comprising:
   receiving, within an electronic system, image data from an optical image sensor and wherein said image data comprises data for one or more color channels;
   accessing a Bezier patch array, wherein said Bezier patch array comprises control points for each of said one or more color channels, wherein said control points define a surface which is a reciprocal function for correcting a lens shading distortion; and
   utilizing said Bezier patch array with said image data to produce corrected image data.

2. A method as described in claim 1 wherein said Bezier patch array comprises patches of a bi-cubic Bezier form.

3. A method as described in claim 1 wherein said Bezier patch array comprises 100 control points and wherein said Bezier patch array comprises 9 patches.

4. A method as described in claim 1 wherein a portion of said control points are located on boundaries of a Bezier patch of said Bezier Patch array and are shared between Bezier patches.

5. A method as described in claim 1 wherein said optical image sensor is a complementary metal-oxide-semiconductor (CMOS) sensor.

6. A method as described in claim 1 wherein said optical) image sensor is a charge-coupled device (CCD) sensor.

7. A method as described in claim 1 wherein said Bezier patch array comprises a respective Bezier surface for each color channel.

8. A method as described in claim 1 wherein said Bezier patch array comprises a respective Bezier surface for each of a plurality of illumination types.

9. A method as described in claim 8 wherein said illumination type is selected from the group consisting of: tungsten, florescent and daylight.

10. A method as described in claim 1 wherein said Bezier patch array comprises 100 control points and wherein said Bezier patch array comprises 9 patches.

11. An image signal processing system comprising:
    an optical sensor operable to capture image data;

a processing unit operable to receive image data from said optical sensor and wherein said processing unit is operable to process said image data to correct for lens shading distortion based on a plurality of values defining a plurality of reciprocal surfaces;

a channel selector for selecting image data of a single color channel for said processing unit to receive; and a memory operable to store said plurality of values wherein said plurality of reciprocal surfaces comprise a respective surface for each of a plurality of color channels.

12. An image signal processing system as described in claim 11 wherein said plurality of reciprocal surfaces comprise a respective surface for each of a plurality of lighting conditions.

13. An image signal processing system as described in claim 11 wherein said reciprocal surface is a Bezier surface.

14. An image signal processing system as described in claim 13 wherein said Bezier surface comprises a plurality of Bezier patches having one or more control points on a boundary of said plurality of Bezier patches and shared between two Bezier patches.

15. An image signal processing system as described in claim 11 wherein said processing unit is operable to correct said image data on a per color channel basis.

16. A method of image signal processing, said method comprising:

receiving, within an electronic system, image data from an optical image sensor and wherein said image data comprises data for one or more color channels;

accessing a Bezier patch array, wherein said Bezier patch array comprises control points for each of said one or more color channels, wherein said control points define a surface which is a reciprocal function for correcting a lens shading distortion, and wherein a portion of said control points are located on boundaries of a Bezier patch of said Bezier Patch array and are shared between Bezier patches; and utilizing said Bezier patch array with said image data to produce corrected image data.

17. A method as described in claim 16 wherein said Bezier patch array comprises patches of a bi-cubic Bezier form.

18. A method as described in claim 16 wherein said Bezier patch array comprises a respective Bezier surface for each color channel.

19. A method as described in claim 16 wherein said Bezier patch array comprises a respective Bezier surface for each of a plurality of illumination types.

20. A method as described in claim 19 wherein said illumination type is selected from the group consisting of: tungsten, florescent and daylight.

* * * * *